(12) United States Patent
Mazzaferro et al.

(10) Patent No.: US 7,753,416 B2
(45) Date of Patent: Jul. 13, 2010

(54) HIGH-STRENGTH THREADED JOINTS, PARTICULARLY FOR LINED TUBES

(75) Inventors: Gastón Mauro Mazzaferro, Buenos Aires (AR); Nestor Jesús Santi, Buenos Aires (AR)

(73) Assignee: Tenaris Connections Limited, Kingstown (VC)

( * ) Notice: Subject to any disclaimer, the term of this patent is extended or adjusted under 35 U.S.C. 154(b) by 61 days.

(21) Appl. No.: 12/134,090

(22) Filed: Jun. 5, 2008

(65) Prior Publication Data

US 2008/0303274 A1 Dec. 11, 2008

(30) Foreign Application Priority Data

Jun. 5, 2007 (AR) .............................. P070102406

(51) Int. Cl.
*F16L 25/00* (2006.01)
(52) U.S. Cl. ........................... 285/333; 285/334
(58) Field of Classification Search ......... 285/333–334, 285/355, 390
See application file for complete search history.

(56) References Cited

U.S. PATENT DOCUMENTS

| | | | | |
|---|---|---|---|---|
| 2,487,241 A | * | 11/1949 | Hilton | 285/334.2 |
| 3,572,777 A | * | 3/1971 | Blose et al. | 285/334 |
| 4,384,737 A | * | 5/1983 | Reusser | 285/334 |
| 4,706,997 A | * | 11/1987 | Carstensen | 285/13 |
| 4,856,828 A | * | 8/1989 | Kessler et al. | 285/334.1 |
| 4,955,645 A | * | 9/1990 | Weems | 285/355 |

FOREIGN PATENT DOCUMENTS

| CA | 2319926 | 7/2008 |
|---|---|---|
| EP | 0104720 A1 | 4/1984 |

OTHER PUBLICATIONS

Search Report and Search Opinion dated Sep. 17, 2008 from European Application No. 08157472.5.
American Petroleum Institute, Specification 5B, Apr. 2008, 15th Edition (Excerpts Only).

* cited by examiner

*Primary Examiner*—Aaron M Dunwoody
*Assistant Examiner*—Fannie Kee
(74) *Attorney, Agent, or Firm*—Knobbe Martens Olson & Bear LLP

(57) ABSTRACT

A threaded tubular joint comprising male and female members is provided. The ends of the male members comprise an upper portion and a lower portion located between an upper threaded portion and an inner surface of each of the male ends. The upper portion is formed by a thread bevel which transitions into a first rounded area and the lower portion is formed by a second rounded area. A reversibly deformable ring may be housed within a central section of the joint. When the male members are substantially engaged within the joint, the ring is compressed by the ends of the male members.

18 Claims, 3 Drawing Sheets

HIGH-STRENGTH THREADED JOINTS, PARTICULARLY FOR LINED TUBES

CROSS-REFERENCE TO RELATED APPLICATIONS

This application claims priority to Argentinean Patent Application No. ARP070102406, entitled "High-Strength Threaded Joint, Particularly For Lined Tubes", filed Jun. 5, 2007, the entirety of which is hereby incorporated by reference.

BACKGROUND OF THE INVENTION

1. Field of the Invention

Embodiments of the present disclosure relate to joints and, in particular, relate to joints for the connection of tubular members that may be used for applications such as well tubing or well casings.

2. Description of the Related Art

Threaded joints are often employed as connections for structures such as tubing and may comprise a female member that is internally threaded at both ends, designated as sleeve or box, and two externally threaded male members matching the threaded surfaces of the female member. The correspondence between the threads of the male and female members allows the male members to be attached to each end of the female member by the threaded surfaces. One type of joint presently used is described in the American Petroleum Institute (API) 5B Standard.

The length of the engaged, threaded sections of the male and female members in this type of joint is limited, however. As a result, the engaged threads may become disengaged under load, for example, tensile loadings, combined bending and tensile loadings, and/or shear loadings. The most frequent failure mode in this type of joints is disengagement.

Another disadvantage of such joints is disturbances that arise in the flow lines of fluid flowing within the tube to which the joint is attached. Such disturbances are caused by a shoulder formed between the inner surfaces of the male and female members.

From the forgoing, then, there is a continued need for improved joints for the connection of tubular structures.

SUMMARY

In one embodiment, a threaded joint for use in connecting tubes is provided. For example, the threaded joint may comprise a tubular coupling, or female component, which receives a pair of male ends of tubes to be coupled. The tubular coupling may possess a threaded inner surface which is adapted to mate with threaded outer surfaces of the male tube ends. The male ends of the tubes comprise a bevel interconnected with a first rounded portion which further transitions into a second rounded portion that is interconnected with an inner surface of the tubes, where the first and second rounded portions possess first and second radii of curvature, respectively. In certain embodiments, the first and second rounded portions may be separated from each other by a transition zone. The male ends of the tubes are not in contact with one another, and further define a central section therebetween within the female component in which an elastomeric ring may be positioned such that the ring is compressed by the ends of the male members when received by the tubular coupling. A metallic insert may be further positioned within the ring so as to provide structural support to the ring.

In another embodiment, a threaded joint is provided. The threaded joint comprises a tubular coupling possessing a threaded inner surface along at least a portion of its length. The threaded joint further comprises a pair of tubes that are received within the tubular coupling and comprise an external threaded surface and a substantially thread-free end.

The thread-free end of the tubes may also comprise: a first portion comprising a thread bevel that overlaps a selected portion of the external threaded surface and that is substantially continuous with a first rounded section having a first radius of curvature. The thread-free end of the tubes may also comprise a second portion comprising a second rounded section adjacent the first rounded section, the second rounded section having a second radius of curvature.

In a further embodiment of the threaded joint, the first rounded area of the thread-free end of the tubes extends from the thread bevel up to a point of its curvature where a tangential line to the point is substantially perpendicular to a longitudinal axis of the tubes.

In another embodiment of the threaded joint, the second rounded area of the thread-free end of the tubes extends from a point of its curvature where a tangential line to the point is substantially perpendicular to the longitudinal axis of the tubes to an inner surface of the tube.

In an additional embodiment of the threaded joint, the bevel comprises an angle of about 65° with respect to a line extending approximately perpendicular to a longitudinal axis of the tubes.

In other embodiments of the threaded joint, the first and second radii of curvature are approximately equal. In additional embodiments of the threaded joint, the first and second radii of curvature are approximately 1.5 mm.

In further embodiments of the threaded joint, the first and second rounded areas are substantially adjacent to one another.

In additional embodiments, the first and second rounded areas are connected to one another by a transition zone. In other embodiments, the transition zone extends between a first point of curvature of the first rounded area and a second point of curvature of the second rounded area where a tangential line to the first and second points is substantially perpendicular to a longitudinal axis of the tubes.

In additional embodiments the threaded joint may further comprise a central section between the thread-free ends of the pair of tubes. The reversibly deformable ring is positioned within the central section so as to be laterally compressed by the thread-free ends of the tubes. At least one metallic insert may also be positioned inward of the ring.

In further embodiments, the threaded joint comprises an 8 round API thread profile according to the American Petroleum Institute (API) 5B standard with a diameter interference from about 0 to 2 mm.

DETAILED DESCRIPTION

Figure 1:
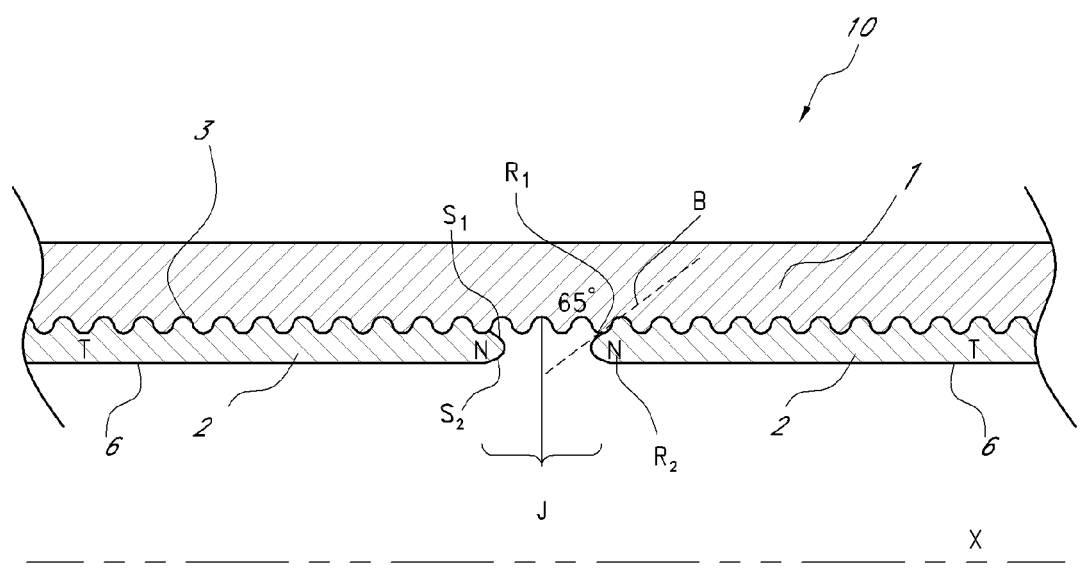
FIG. 1 is a cross-sectional view of an embodiment of a central section (J) of a threaded joint.

Embodiments of the present disclosure provide a threaded joint having an improved capability to receive inner linings as compared with previously developed threaded joints. In one embodiment, threads that substantially vanish along the tube body with non-upset ends are employed. In further embodiments, such threads may comprise approximately 8 round American Petroleum Institute (API) threads according to the American Petroleum Institute (API) 5B standard. In another embodiment, the joint comprises male and female members and is threaded substantially along its length. The ends of the male members comprise two portions, an upper portion and a lower portion, located between an upper threaded portion and an inner surface of each of the male ends. The upper portion is formed by a thread bevel which transitions into a first rounded area with a first radius of curvature, and the lower portion is formed by a second rounded area with a second radius of curvature. In one embodiment, the first and second radii of curvature are substantially equal and constant, thereby forming the front end of the male members.

In certain embodiments, the radii of curvature are provided so as to be approximately equal to the maximum possible radii of curvature that improves the adhesion features of the inner lining to the tube when the front end of the tube is of minimum thickness. For example, in one embodiment, the radii of curvature are about 1.5 mm.

In additional embodiments, a reversibly deformable ring may be housed in the center of the joint. In certain embodiments, the reversibly deformable ring may comprise an elastomer, for example, a rubber. When the male members are substantially fully engaged within the joint, the ring is compressed by the ends of the male members. This configuration provides geometric continuity within the inner surface of the joint, and the corrosion protection barrier of the inner lining of the tube. The ring can also, optionally, be fitted with at least one insert made of a high-strength and corrosion resistant material, such as stainless steel, that provides the ring with structural strength and serves as a centering guide to the tools passing through the joint. These features in turn provide structural protection to the inner lining in the area.

Joints of tubes, particularly lined tubes, may be made by modifying the front end of the male members, such as providing a rounded nose on the male members, and applying a coating into a central section (J-section) of the joint, referred to as the J-section, located between the noses of the male members. Such configurations may be problematic for several reasons. In one aspect, the threaded section of the joint is interrupted, limiting the capability of the joint to transmit structural loads such as tensile, compression, bending, or torsional loads. In another aspect, the use of threaded joints having about 10 threads per inch (2.54 cm) in tubes smaller than about 32 inches (8.89 cm) in diameter encounter operational problems due to an increased tendency for misalignment and gripping during tightening. In a further aspect, the J-section results in a geometric discontinuity of the inner surface of the joint, resulting in a configuration where the front ends of the male member at the connection sections remain exposed and may be hit by passing tools during service, which may damage their inner lining.

Beneficially, embodiments of the presently disclosed joints may substantially avoid such problems by virtue of structural features which may include, but are not limited to:

Thread length: By configuring the joint such that the threads substantially vanish in the tube body, the capability of the joint to transmit structural loads, such as tensile, compression, bending and torsional loads, and combinations thereof, is increased.

Thread pitch: A thread with about 8 threads per inch (2.54 mm) may used for the applicable ranges of tube diameters and thicknesses, allowing for a faster tightening, as less turns are required to tighten the joint. Furthermore, tightening may be accomplished more safely, as this thread pitch is less likely to become misaligned or grip during tightening Deformable ring: In certain embodiments, the use of a deformable ring in the joint of the present disclosure provides geometric continuity at about the inner surface of the joint. The geometric continuity provided by the ring may further serve as a corrosion protection barrier, as such continuity keeps the fluid flowing away from the threads of the joint, secondarily contributing to tightness of the connection. The optional metallic insert, formed from a material possessing high hardness and corrosion resistance, for example stainless steel, further provides structural strength to the joint and may serve as a centering guide for tools passing through the joint, thereby providing structural protection to the inner lining of the joint.

Non-upset ends (NUE): The use of non-upset ends substantially inhibits alterations in the inner diameter of the joint that might expose the inner lining to damage from tools passing through the joint during service.

FIG. 1 shows one embodiment of a threaded joint 10 comprising a female threaded member or tubular coupling 1 which receives a plurality of substantially tubular male threaded ends 2 of tubes T. The female and male portions of the joint 10 are configured such that a threaded inner surface of the female member 1 and a exterior threaded surface of the male threaded ends 2 of the tubes T substantially mate, allowing the female and male portions to be screwed together to form the threaded joint 10. As further illustrated in FIG. 1, the threads of the joint 10 have a round thread profile 3. In one embodiment, the thread profile comprises approximately 8 round API threads according to the American Petroleum Institute (API) 5B standard, with a diameter interference that ranges from about 0 to 2 mm. Additional information regarding couplings and tubes may be found in Argentinean Patent No. AR20457B1 and Canadian Patent Application No. CA2319926, each of which are incorporated by reference in their entirety.

In further embodiments, the threaded ends 2 may comprise a substantially thread-free portion, or nose N, having an upper portion and a lower portion. An upper portion of the nose N may comprise a thread bevel B that overlaps a selected portion of the external threaded surface of the male threaded ends 2 of the tubes T and further continues into a first rounded area $S_1$. In one embodiment, the bevel B may comprise an angle of about 65° with respect to a line extending approximately perpendicular to a longitudinal axis of the tubes. In another embodiment, the first rounded area S1 extends from the thread bevel B up to a point of its curvature where a tangential line to the point is substantially perpendicular to the longitudinal axis X of the tubes T. In one embodiment, a first radius of curvature, $R_1$, of the first rounded area $S_1$ is about 1.5 mm.

In a further embodiment, the lower portion of the male threaded ends 2 of the tubes T is also formed by a second rounded area, $S_2$, having a second radius of curvature $R_2$. The second rounded area $S_2$ extends from a point of its curvature where a tangential line to the point is substantially perpendicular to the longitudinal axis X of the tubes T, up to an inner surface 6 of the tubes T. In another embodiment, $R_2$ is about 1.5 mm.

Figure 3:
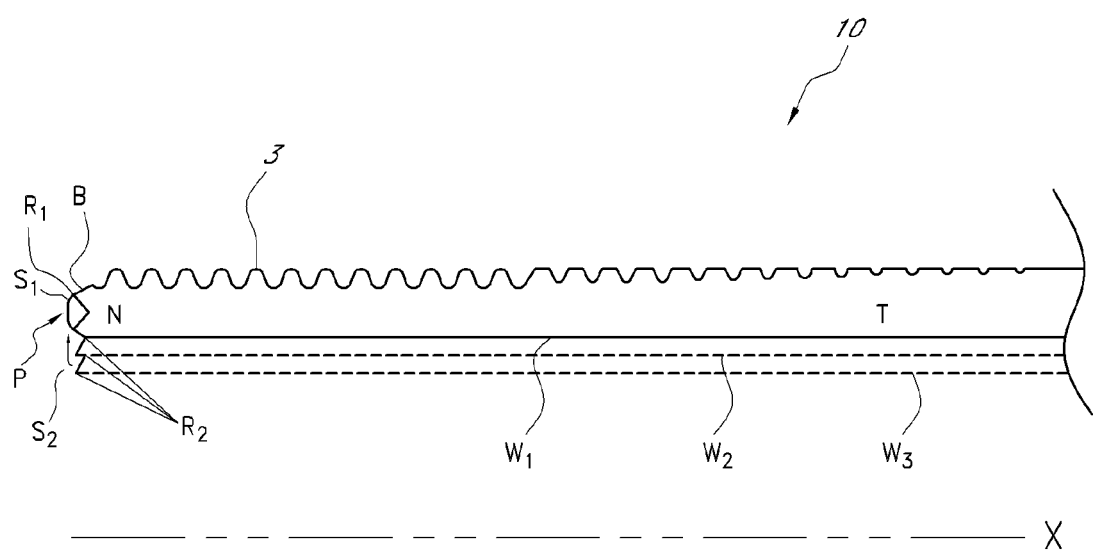
FIG. 3 is a side view of an embodiment of a nose portion of a joint of the present disclosure according to different tube thicknesses.

The first and second rounded areas $S_1$, $S_2$ may be substantially adjacent one another in the case of a tube of minimum thickness $W_1$. However, in the case of tubes with medium $W_2$ or maximum thickness $W_3$, the radii of curvature $R_1$, $R_2$ are connected by a transition zone P. The transition zone P extends between the points of said rounded areas $S_1$, $S_2$ where a line tangential to said points is substantially perpendicular to the longitudinal axis X of the tubes T, as can be seen in FIG. 3.

It may be noted that during use, in certain embodiments, the grooves between the crest and the valley of the threads may be filled with grease.

Figure 2:
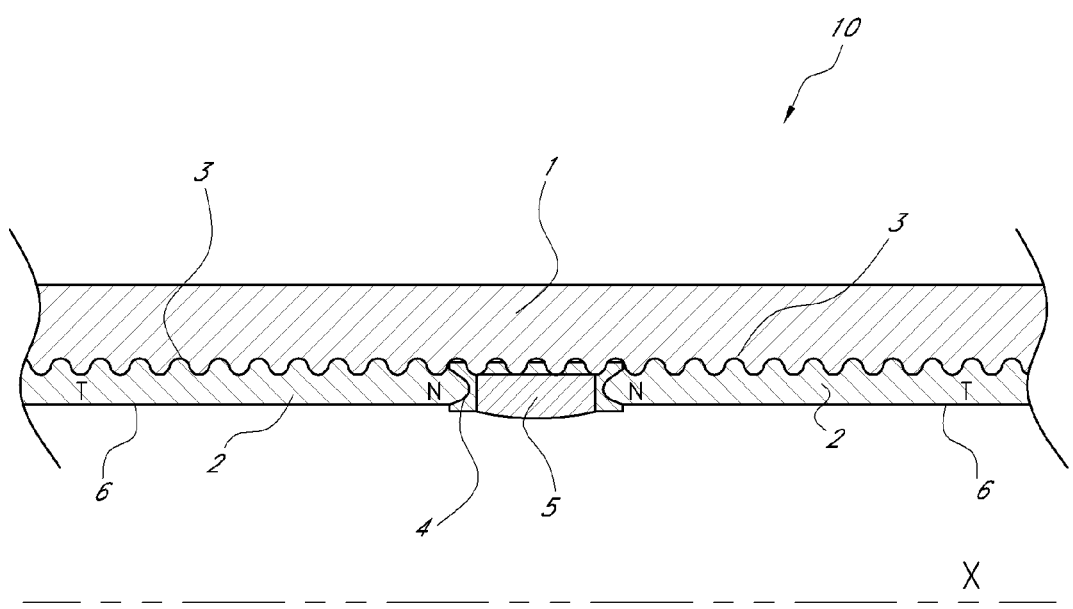
FIG. 2 is a cross-sectional view of an embodiment of a central section of a threaded joint illustrating positioning of an elastomeric ring with a metallic insert within the central section.

FIG. 2 illustrates another embodiment of the joint 10 in which a ring 4 is interposed within the central section J which is located substantially between the noses N of the male threaded ends 2 of tubes T. In certain embodiments, the ring 4 comprises an elastomeric material, such as a rubber. So configured, the ring 4 may be compressed in a direction substantially parallel to the axis of the joint 10 by both noses N of the tubes T. Beneficially, the compressed ring 4 provides geometric continuity to the threaded joint in the central section J, by separating the flowing fluid from the thread, and further secondarily contributes to the tightness of the threaded joint.

Optionally, said elastomeric ring 4 may further include at least one metal insert 5 formed from a material having high hardness and corrosion resistance, such as stainless steel. In this manner, the ring 4 and the metal insert 5 provide the joint 10 with structural resistance to deformation and serves as a centering guide for the tools passing through the tubes T, further providing structural protection to the lining of the joint 10.

Although the foregoing description has shown, described, and pointed out the fundamental novel features of the present teachings, it will be understood that various omissions, substitutions, and changes in the form of the detail of the apparatus as illustrated, as well as the uses thereof, may be made by those skilled in the art, without departing from the scope of the present teachings. Consequently, the scope of the present teachings should not be limited to the foregoing discussion, but should be defined by the appended claims.

What is claimed is:

1. A threaded joint, comprising:
    a tubular coupling possessing a threaded inner surface along at least a portion of its length;
    a pair of tubes that are received within the tubular coupling and comprise an external threaded surface and a substantially thread-free end, the thread-free end comprising:
    a first portion comprising a thread bevel that overlaps a selected portion of the external threaded surface and that is substantially continuous with a first rounded area having a first radius of curvature;
    a second portion comprising a second rounded area adjacent the first rounded area, the second rounded area having a second radius of curvature; and
    wherein the first and second radii of curvature are about 1.5 mm.

2. The threaded joint of claim 1, wherein the first rounded area of the thread-free end of the tubes extends from the thread bevel up to a point of its curvature where a tangential line to the point is perpendicular to a longitudinal axis of the tubes.

3. The threaded joint of claim 2, wherein the second rounded area of the thread-free end of the tubes extends from a point of its curvature, where a tangential line to the point is perpendicular to the longitudinal axis of the tubes, to an inner surface of the tube.

4. The threaded joint of claim 1, wherein the bevel comprises an angle of about 65° with respect to a line extending perpendicular to a longitudinal axis of the tubes.

5. The threaded joint of claim 1, wherein the first and second rounded areas meet at a common point where a tangential line is perpendicular to a longitudinal axis of the tubes.

6. The threaded joint of claim 1, wherein the first and second rounded areas are connected to one another by a transition zone.

7. The threaded joint of claim 6, wherein the transition zone is flat and extends between a first point of curvature of the first rounded area and a second point of curvature of the second rounded area where a tangential line to the first and second points is perpendicular to a longitudinal axis of the tubes.

8. The threaded joint of claim 1, further comprising a central section between the thread-free ends of the pair of tubes.

9. The threaded joint of claim 8, wherein an elastomeric ring is positioned within the central section so as to be laterally compressed by the thread-free ends of the tubes.

10. The threaded joint of claim 9, further comprising at least one metallic insert positioned inward of the ring.

11. The threaded joint of claim 1, wherein the joint further comprises 8 round threads per inch and a diameter interference of about 0 to 2 mm.

12. A threaded joint for lined tubes, comprising:
    a coupling with a threaded inner surface along its whole length and female ends; and
    a pair of tubes, each having male ends, with an external threaded surface and a thread-free end comprising a nose, said tubes defining a longitudinal axis;
    said joint having 8 round threads per inch, with a diameter interference from about 0 to 2 mm;
    wherein each of the noses of the pair of tubes comprises:
    an upper portion formed by a thread bevel with a slope of substantially 65 degrees relative to a line perpendicular to the longitudinal axis, which transitions to a first rounded area with a first radius of curvature of 1.5 mm; and
    a lower portion including a second rounded area with a second radius of curvature of 1.5 mm;
    said thread bevel overlapping with said thread profile and said first rounded area extending from said thread bevel to a point of its curvature where a tangential line is perpendicular to the longitudinal axis of said tubes, said second rounded area extending from a point of its curvature where a tangential line is perpendicular to the longitudinal axis to an inner surface of said tube;
    wherein the tubes are lined and the first and second radii of curvature of 1.5 mm are configured to improve adhesion of the lining to the tubes and provide either a flat transition zone between the first and second rounded areas or a common point between the first and second rounded areas that coincides with said points of said rounded areas.

13. The threaded joint according to claim 12, wherein the first and second radiuses of curvature are located one next to the other.

14. The threaded joint according to claim 12, wherein the first and second radiuses of curvature are connected to each other by a transition zone.

15. The threaded joint according to claim 14, wherein the transition zone is flat and extends between said points of said rounded areas where a line tangential to said points is perpendicular to the longitudinal axis.

16. The threaded joint according to claim 12, wherein between the noses of both male threaded members is a central section.

17. The threaded joint according to claim 16, wherein the central section includes an elastomeric ring which is laterally compressed by said noses of said tubes.

18. The threaded joint according to claim 17, wherein the elastomeric ring includes at least one metal insert.

* * * * *